US008461259B2

(12) United States Patent
van Herwijnen et al.

(10) Patent No.: US 8,461,259 B2
(45) Date of Patent: Jun. 11, 2013

(54) BINDER FOR MATERIALS BASED ON WOOD CHIPS AND/OR WOOD FIBERS, METHOD FOR THE PRODUCTION OF SAID BINDER, AND MOLDED ARTICLE

(75) Inventors: Hendrikus W. G. van Herwijnen, Hausleiten-Goldgeben (AT); Wolfgang Heep, Woltersdorf (DE); Detlef Krug, Dresden (DE); Andreas Weber, Tharandt Ot Spechtshausen (DE); Axel Höhling, Berlin (DE); Maria Schultze, Heidesee Ot Friedersdorf (DE)

(73) Assignee: Dynea Oy, Helsinki (FI)

( * ) Notice: Subject to any disclaimer, the term of this patent is extended or adjusted under 35 U.S.C. 154(b) by 452 days.

(21) Appl. No.: 12/809,515

(22) PCT Filed: Dec. 17, 2008

(86) PCT No.: PCT/EP2008/067781

§ 371 (c)(1),
(2), (4) Date: Sep. 20, 2010

(87) PCT Pub. No.: WO2009/077571

PCT Pub. Date: Jun. 25, 2009

(65) Prior Publication Data

US 2011/0021669 A1 Jan. 27, 2011

(30) Foreign Application Priority Data

Dec. 19, 2007 (DE) ........................ 10 2007 063 430

(51) Int. Cl.

| | |
|---|---|
| ***B27N 3/00*** | (2006.01) |
| ***C08K 5/17*** | (2006.01) |
| ***C08L 61/00*** | (2006.01) |
| ***C08L 97/02*** | (2006.01) |
| ***C09J 161/34*** | (2006.01) |
| ***C09J 189/00*** | (2006.01) |

(52) U.S. Cl.
USPC ........ 525/54.11; 525/54.1; 525/398; 144/361

(58) Field of Classification Search
USPC ..................................... 525/54.11, 54.1, 398
See application file for complete search history.

(56) References Cited

U.S. PATENT DOCUMENTS 5,506,285 A 4/1996 Timm et al.

FOREIGN PATENT DOCUMENTS

| | | |
|---|---|---|
| EP | 1 318 000 B1 | 6/2003 |
| EP | 1318000 A2 * | 6/2003 |
| WO | WO 2008/026056 A2 | 3/2008 |

OTHER PUBLICATIONS

M. Dunky and P. Niemz: Holzwerkstoffe und Leime; Technologie und Einflußfaktoren, Springer-Verlag Heidelberg, 2002, pp. 394-403, 8 pages.
B. Meyer and C. Böhme, "'Formaldehydabgabe wie gewachsenes Holz'—Was ist das?". (1994), pp. 1258-1259.
B. Meyer and C. Böhme, Holz Zentralblatl, "Formaldehydabgabe von natürlich gewachsenem Holz", V. 120, No. 12, (Oct. 1994), 3 pages.
B. Meyer and C. Böhme, "Massivholz und Formaldehyd", Holz als Roh-und Werkstoff, vol. 53 (1995), 1 page.
Krug, D.; Sirch, H.-J, "Protein als Kleber, Anteilige PF-Harz-Substitution möglich", Holz-Zent.bl. 125 (1999), 1 page.
M. Dunky and P. Niemz: Holzwerkstoffe und Leime; Technologie und Einflußfaktoren, Springer-Verlag Heidelberg, 2002 (On Order).
B. Meyer and C. Böhme, Holz- und Kunststoffverarb. 29 (1994) 1258-1259 (On Order).
Holz Zentr. Bl. 120 (1994) 1969-1972 (On Order).
Holz Roh. Werkst. 53 (1995) 135 (On Order).
Krug, D.; Sirch, H.-J: Protein als Kleber; Anteilige PF-Harz-Substitution möglich. Holz-Zent.bl. 125 (1999), 773 (On Order).

* cited by examiner

*Primary Examiner* — Kelechi Egwim
(74) *Attorney, Agent, or Firm* — Christie, Parker & Hale, LLP

(57) ABSTRACT

The invention relates to a binder for producing materials based on wood chips and/or wood fibers. The aim of the invention is to design a binder which is used for producing and gluing materials based on wood chips and/or wood fibers, contains natural protein components, significantly reduces or even eliminates the drawbacks of the prior art, and can be economically produced and used. Said aim is achieved by a binder which is used for materials based on wood chips and/or wood fibers, comprises an aldehyde-based condensation resin and other additives, and is characterized in that the binder comprises a water-soluble reactive additive containing a peptide/amino acid mixture without moieties of water-insoluble and high-viscosity proteins. The invention also relates to a method for producing said binder as well as a molded article.

14 Claims, 5 Drawing Sheets

| Sample | Water solubility [% w/w] | $N_{tot.}$ (Soluble fraction) [% w/w] | Polypeptide (Soluble fraction) [% w/w] |
|---|---|---|---|
| WP 1 | 53.5 | 5.1 | 31.9 |
| Reactive additive | 100 | 13.8 | 86.3 |

Fig. 2

| Characteristic value | Resin starting material (PF resin, no reactive additive) (i) | Mixture of PF resin and reactive additive (ii) | Binder prepared by incorporating the reactive additive by condensation during production of PF resin (iii) | Binder prepared by incorporating WP component by condensation during production of PF resin (iv) |
|---|---|---|---|---|
| Gluing degree expressed as solid resin/solids fraction based on abs. dry fiber (%) | 7 | 7 (PF) + 3 (reactive additive) | 10 | 10 |
| Board thickness (mm) | 8.52 | 8.53 | 8.18 | 8.23 |
| Raw density (kg/m³) | 916 | 886 | 887 | 845 |
| Flexural strength (N/mm²) | n.d. | n.d. | 46.9 | 39.3 |
| Flexural modulus of elasticity (N/mm²) | n.d. | n.d. | 3830 | 3300 |
| Transverse tensile strength in dry state (N/mm²) | 1.58 | 1.63 | 1.32 | 1.06 |
| Perforator value according to EN 120 (mg/100 g abs. dry board) B value | 15.2 | 12.3 | 0.3±0.1 | 0.3±0.1 |

Fig. 3

| Characteristic value | Resin starting material (UF resin, no reactive additive) (iv) | Mixture of UF resin and reactive additive (v) | Binder prepared by incorporating the reactive additive by condensation during production of UF resin (vi) |
|---|---|---|---|
| Gluing degree expressed as solid resin/solids fraction based on abs. dry particles (%) | 10 | 9 (UF) + 1 (Reactive additive) | 10 |
| Board thickness (mm) | 16 | 16 | 16 |
| Raw density (kg/m³) | 668 | 638 | 644 |
| Transverse tensile strength in dry state (N/mm²) | 0.66 | 0.17 | 0.30 |
| Perforator value according to EN 120 (mg/100 g abs. dry board) | 9.0 | 8.8 | 7.5 |

Fig. 4

| Characteristic value | Reactive additive as powder | Reactive additive as aqueous solution |
|---|---|---|
| Gluing degree expressed as solid resin/solids fraction based on abs. dry fiber (%) | 20 | 20 |
| Board thickness (mm) | 10.59 | 10.39 |
| Raw density ($kg/m^3$) | 688 | 720 |
| Transverse tensile strength in dry state ($N/mm^2$) | 0.04 | 0.05 |
| Perforator value according to EN 120 (mg/100 g abs. dry board) | 0.2 | 0.5 |

Fig. 5

BINDER FOR MATERIALS BASED ON WOOD CHIPS AND/OR WOOD FIBERS, METHOD FOR THE PRODUCTION OF SAID BINDER, AND MOLDED ARTICLE

CROSS-REFERENCE TO RELATED APPLICATION

This application is a National Phase Patent Application and claims the priority of International Application Number PCT/EP2008/067781, filed on Dec. 17, 2008, which claims priority of German Patent Application Number 10 2007 063 430.9, filed on Dec. 19, 2007.

The invention relates to a binder for producing materials based on wood chips and/or wood fibers, the binder according to the invention being used for producing and gluing e.g. wood dust-type, wood chip-type, wood veneer-type, solid wood-type materials and/or materials based on fibers, such as wood and/or plant fibers, e.g. annual and perennial plants.

The material thus produced is a board, mat or a molded article produced from wood and/or fiber particles of any geometry and consistency, such as a chipboard, a plywood panel, a solid wood board, a board based on chip-type materials such as OSB (oriented strand board), laminated strand board (LSL) or a board based on veneers, such as LVL (laminated veneer lumber), or plywood. Other possible wood materials are fiber boards, fiber mats, such as an insulating fiber mat, as well as molded articles produced therefrom, or combinations of the individual materials, although the above-mentioned items do not represent a rating description of possible uses of the binder according to the invention.

The binders currently used for producing such materials are almost exclusively synthetic binders.

Quantitatively, by far the most significant part, namely about 6 million tons/year (estimated as a liquid form of supply) in Europe, involves formaldehyde-based condensation resins such as urea-formaldehyde (UF), melamine-formaldehyde (MF), melamine-urea-formaldehyde (MUF), melamine-urea-phenol-formaldehyde (MUPF), phenol-formaldehyde (PF), phenol-melamine-formaldehyde (PMF), phenol-urea-formaldehyde (PUF), resorcinol-phenol-formaldehyde (RPF), resorcinol-phenol-urea-formaldehyde (RPUF) or mixtures thereof.

Also, but to a much lesser extent, adhesives from the group of polyurethanes and so-called polymeric diphenylmethane diisocyanates (PMDI) as well as thermoplastic binders, such as those based on polyolefins, polyvinyl chloride, thermoplastic bonding fibers, polyvinyl acetates or polyvinyl alcohols, are being used.

More specifically, synthetic binders are advantageous in that, by way of selecting the latter, targeted influence on the properties of the materials produced therefrom is possible and their production can be made highly effective, and that property-related insensitivity to the basic chemical raw materials is existing, especially in terms of time or seasonal conditions.

One apparent drawback is that the starting materials required to produce the synthetic binders are ultimately based on petroleum/natural gas or carbon chemistries. These resources are limited and subject to major fluctuations in price and availability as a result of economic and socio-political developments in recent years and the ongoing globalization. The increase in prices observed over prolonged periods will tend to continue as a result of the worldwide ever-increasing consumption of oil, gas and coal and a possible shortage of resources.

From an ecological view and with respect to long-term, sustainable resource economy, careful treatment of these irretrievably limited resources and search for alternatives therefore should be given top priority. In recent years, attempts have therefore been made to increasingly redevelop, market and use natural animal- and vegetable-based binders.

Such binders on a natural basis have been known since antiquity and used over the centuries. In this context, glues and adhesives based on animal connective tissue, such as glutin glue, based on milk proteins, such as casein glues, or based on water-soluble proteins, such as blood albumin glues, should be mentioned as examples.

For many years, there has been work on improved, alternative, natural binders, e.g. based on polyphenolic wood constituents such as tannins, binders based on various lignin variants, binders based on vegetable proteins, such as soybeans and wheat, or based on starch and sugars, just to name a few examples, without claiming completeness of the above-mentioned items. There is extensive literature relating to such activities, e.g. M. Dunky and P. Niemz: Holzwerkstoffe und Leime; Technologie und Einfluβfaktoren, Springer-Verlag Heidelberg, 2002.

Despite all efforts, natural binding agents still involve significant drawbacks residing, in particular, in the processing characteristics, technological parameters of use, achievable properties of the materials produced therefrom, as well as in the entire cost structure.

Thus, in particular, the press times used in industrial manufacturing of boards are still well above those when using synthetic binders. Similarly, most of the natural components are not obtained with a defined composition, thus significantly impeding their use and the reproducibility of characteristic values achievable with these products for materials produced therefrom.

It is therefore much more promising to combine natural and synthetic binders. Thus, wheat and rye flours have been used for decades in glue baths for plywood production both as extenders and to increase the cold tack of glues used.

Although limited in use, natural binders and products are now firmly established as fillers and extenders for synthetic glues. However, when using such fillers and extenders based on natural raw materials, it must be assumed in most cases that there will be no effective chemical incorporation or binding to the synthetic binder to form chemical primary bonds. Only mechanical fixing in the cured network of the synthetic binder or partial binding via secondary valences is conceivable.

It would therefore make much more sense to actively incorporate such natural binders or products in synthetic binder systems to form direct chemical bonds. This would imply that the substances used, based on natural raw materials, not only serve as rather inactive fillers and extenders, but make a direct contribution as an active binding agent.

This would also provide important labor market stimuli by creating more jobs in agriculture, save resources and minimize the use of substances considered critical in ecological terms, such as formaldehyde.

Emissions of formaldehyde from finished materials and products such as those mentioned above as examples of various wood materials can be reduced to very low values as a result of the sufficiently well known formaldehyde-binding effect of proteins. Some natural substances such as wood materials are known to contain naturally formed formaldehyde, as has been described in detail in the literature (e.g. B. Meyer and C. Böhme, Holz- and Kunststoffverarb. 29 (1994) 1258-1259; or Holz Zentr. Bl. 120 (1994) 1969-1972; or Holz Roh. Werkst. 53 (1995) 135).

Suitable substances based on natural renewable raw materials can be very different in their chemical nature. Tannins and lignins of varying origin are based on the basic structures of phenol and phenol derivatives; proteins, depending on their origin, are constituted of various amino acids, while other possible substances are based on starch and sugars/carbohydrates. In particular, proteins based on vegetable raw materials have been investigated in more detail in recent years and represent promising compounds for specific uses and direct chemical incorporation in various synthetic binders. Thus, significant improvements have been achieved in recent years by condensation of vegetable protein components into e.g. phenolic resins.

Comprehensive results of this work have been described in EP 1318000. Therein, the amino groups of the proteins are reacted with formaldehyde and crosslinked with the methylol groups of the phenolic resin. However, apart from the great improvements achieved in the properties of the basic synthetic binders, there is still the disadvantage that, due to their relatively high molecular weights, vegetable-based protein components previously used have a poorly suitable, relatively high viscosity of more than 600 mPas at 20° C. in liquid form.

The majority of condensation resins, especially UF, MUF and MUPF resins, are used with a resin content of about 65% so that excess water introduced into the glue system via these natural components must be removed with high input of time and energy, which also limits the potential of incorporation by condensation and the thus achievable product properties of materials produced using these binders. As a result of massive vapor formation, high water contents in the binders being used give rise to technological problems when manufacturing various materials such as boards of different shape and, as a consequence, instability of the boards produced. Another drawback is delayed chemical formation due to shifts of—usually achievable—chemical equilibria away from the cured structures and towards the chemical starting materials.

A wider use of substances and materials based on natural raw materials for the production of binders, regardless whether a pure binder based on these natural raw materials or mixtures or reaction mixtures including various synthetic binders and binder components are concerned, is still opposed by a number of problems and prejudices. In general, the manufacturing costs of such natural or partially natural binders are considerably higher than those of synthetic binders; also, there are still controversial opinions regarding various parameters such as toxicity and biodegradability. As for many types of natural binders, a satisfactory level of technology with respect to the properties of the binders and the use and properties of products produced therefrom has not been achieved as yet. Also, there are still great regional differences with respect to production, properties and use of such natural binders to some extent. Moreover, it is necessary in some cases to prove continuous and qualitatively constant supply of the market with natural binders, particularly with respect to geographical and climatic conditions or existing harvesting conditions.

Also, some binders or binder components based on natural raw materials frequently involve the drawback of lower reactivity compared to various synthetic binders, which is due to the lower number of reactive sites in the molecule and a more complex chemical structure, and consequent slower curing. The lower number of reactive groups and reactive sites also produces a lower degree of crosslinking and, as a consequence, lower crosslinking density, which may result in inferior mechanical and physical properties, such as lower strength.

The object of the invention is therefore to provide a binder for producing and gluing materials based on wood chips and/or wood fibers, which binder contains natural protein components and significantly reduces or even avoids the disadvantages of the prior art and, in addition, can be produced and used economically.

More specifically, this relates to a binder which should be variable in its viscosity within wide limits without requiring adjustment of excessively high water contents. Moreover, the protein component in the binder should have high reactivity so as to be capable of achieving high crosslinking density.

Said object is accomplished by means of a binder for materials based on wood chips and/or wood fibers, comprising an aldehyde-based condensation resin and further additives, which is characterized in that it has a water-soluble reactive additive including a peptide/amino acid mixture without a proportion of water-insoluble, highly viscous proteins such as collagen, wherein "without a proportion" is understood to imply "without a significant proportion". Major proportions of such proteins will adversely affect the water solubility and viscosity of the reactive additive. Water-soluble is understood to imply that at least 94% of the reactive additive will dissolve in water at a temperature of 20° C. Most frequently, the water solubility is even close to 100%.

The method for producing the binder is characterized in that the reactive additive is incorporated in the aldehyde-based condensation resin by chemical condensation during resin production and/or added following resin production and/or immediately prior to processing the binder by grinding or mixing in liquid phase or by means of other suitable mixing procedures.

Using the binder according to the invention, it is possible to produce molded articles based on wood chips and/or wood fibers.

Advantageous developments of the binder are set forth in the subclaims.

In an advantageous development of the binder, the peptides and amino acids in the peptide/amino acid mixture are present in a mass ratio of from 0.1:1 to 10:1.

Another embodiment of the binder according to the invention is characterized in that the reactive additive has a molecular weight distribution of about 90% of the total amount between 0.13 to 50 kilodaltons (kDa) at an average molecular weight of 1 to 20 kDa.

In an advantageous embodiment of the binder, the reactive additive has a reactive amino nitrogen content of from 0.7 to 5%, based on the dry mass.

It is envisaged in a further embodiment that the reactive additive is produced by means of high-pressure thermolysis of proteinaceous animal raw materials in an aqueous medium, which is performed in two stages, wherein in a first stage a temperature of from 140 to 190° C. and a pressure of from 10 to 50 bar is adjusted at a hold time of from 5 to 60 min, and in a second stage a target temperature of from 180 to 230° C. and a pressure of from 20 to 100 bar is adjusted at a hold time of from 1 to 30 min, said hold time decreasing from stage to stage.

In one embodiment of the binder the aldehyde is formaldehyde.

Another embodiment of the binder is characterized in that the formaldehyde-based condensation resin preferably consists of the group of urea-formaldehyde (UF), melamine-formaldehyde (MF), melamine-urea-formaldehyde (MUF), melamine-urea-phenol-formaldehyde (MUPF), phenol-formaldehyde (PF), phenol-melamine-formaldehyde (PMF), phenol-urea-formaldehyde (PUF), resorcinol-phenol-formaldehyde (RPF), resorcinol-phenol-urea-formaldehyde (RPUF) and/or mixtures thereof.

In one development the binder includes 1 to 60% by weight reactive additive.

In one embodiment the binder includes 2 to 50% by weight reactive additive.

One development is characterized in that the binder includes 5 to 40% by weight reactive additive.

One inventive embodiment of the binder is characterized in that hydrophobizing agents, flame retardants and/or fungicides, bactericides, dyes, pigments, odor inhibitors, conductivity-increasing substances, viscosity-increasing additives, as well as fillers or extenders are included as further additives.

In another embodiment the binder includes thermoplastics such as polyolefins, polyvinyl chloride, bonding fibers, polyvinyl acetate and/or additives based on proteins, lignins, tannins, polysaccharides such as starch, and/or polyurethanes as well as polymeric diisocyanates such as polymeric diphenylmethane diisocyanates and mixtures thereof as further additives.

Advantageously, it was found that the reactive additives used can be incorporated preferably by condensation in the appropriate binder from the group of condensation resins based on aldehydes, particularly formaldehyde, during the binder production process. One essential part of the technology described herein is that the reactive additive is chemically incorporated via its large number of reactive groups in the synthetic binder during the preparation thereof, or, in the event of adding the peptide/amino acid mixture to the finished synthetic resin and/or immediately prior to processing the synthetic resin during chemical curing of the synthetic resin via its reactive groups, reacts with the synthetic resin to be chemically incorporated.

In a particularly preferred embodiment, the ratio of included peptides and amino acids with a molecular weight of less than 10 kDa should be 80% and in a highly preferred embodiment more than 90%.

The mass-related shares of all components make 100% in total.

The reactive additive can be used both as an aqueous solution and in spray-dried form.

Spray drying offers the essential advantage that the peptide/amino acid mixture is made extremely stable during storage. It can be used both as an extensively water-soluble powder during the preparation of the synthetic condensation resin and as a powdered additive during grinding and/or other processing of the condensation resins based on aldehydes, e.g. formaldehyde, such as novolaks and solid resols, or in an admixing process with spray-dried synthetic condensation products such as UF, MF and PF or other condensation products based on aldehydes.

Furthermore, the inventive binder produced using the above-mentioned peptide/amino acid mixture can optionally be added with other natural or synthetic components to achieve specific properties (e.g. increase the cold tack, adjust the viscosity, etc.). Such addition can be made during the preparation of the binder according to the invention, to the finished product binder of the invention, or immediately prior to or during processing of the binder according to the invention.

The binder according to the invention and the properties of the materials produced therefrom, achieved using the binder according to the invention, will be illustrated in more detail in the following representations and examples with reference to the drawings wherein:

FIG. 2 shows a comparison of the protein or polypeptide content of wheat protein (WP1) and reactive additive;

FIG. 3 shows a representation of selected material characteristic values of HDF produced using laboratory technology (hot-stage temperature 220° C., press time factor 15 s/mm);

Figure 1:
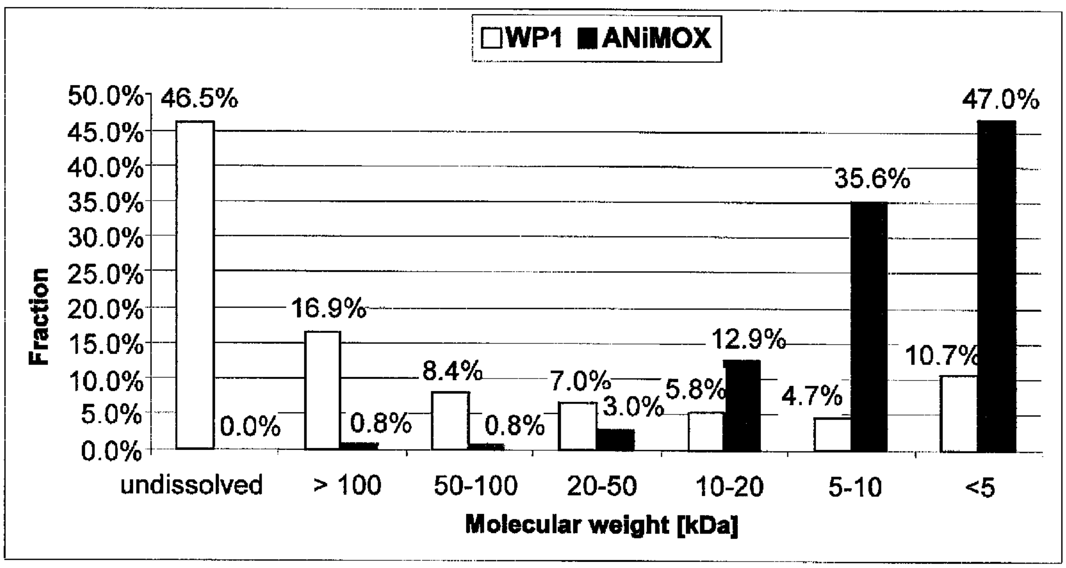
FIG. 1 shows a comparison between a wheat protein (WP1) and the reactive additive with respect to their molecular weight distribution.

FIG. 4 shows a representation of selected material characteristic values of chipboards produced using laboratory technology (hot-stage temperature 220° C., press time factor 9 s/mm); and FIG. 5 shows a representation of selected material characteristic values of chipboards produced using laboratory technology (hot-stage temperature 220° C., press time factor 15 s/mm).

The advantages of the reactive additive used according to the invention are, in particular, that the raw materials are digested to a much higher level so that the molecular mass is significantly lower than e.g. that of wheat proteins well-known for such uses.

For comparison, the peptide size ratio measured by means of gel permeation chromatography (GPC) is represented in FIG. 1. WP1 represents wheat protein glue (Gluvital 21000), a by-product with high value creation potential obtained in traditional starch production (wet process). As a rule, this product is in the form of a powder and contains ~80% (based on dry substance) water-insoluble proteins. Dissolved in an alkaline medium, binders formulated using this product were suitable for manufacturing wood material panels with good dry strength, formaldehyde liberation in the range of native wood, and insufficient moisture resistance of the glued bond. In addition, the high water contents in WP1 binder formulations rendered the achievable press times uneconomical (e.g. Krug, D.; Sirch, H.-J: Protein als Kleber; Anteilige PF-Harz-Substitution möglich. Holz-Zent. bl. 125 (1999), 773).

The molecular weight distributions were determined on a Pharmacia system with a column having a length of 60 cm, a diameter of 1.6 cm and a volume of 60.3 ml. The detection was performed at 280 nm. The column material Sephadex G-100 (separation range: 1 to 150 kDa) was used as stationary phase. PBS buffer was used as mobile phase. Gel chromatography standards from Biorad were used as calibration substances to determine the molecule sizes.

The two products also differ significantly both in the soluble components and in the protein content/polypeptide content (FIG. 2).

In spray-dried condition the reactive additive is 100% redissolvable in water, and no additional water is introduced when using spray-dried products.

EXAMPLE 1

Preparation of Binders (i) Synthetic Resin Starting Material

Phenolic resins for the wood material industry are being produced using an excess of formaldehyde versus phenol, i.e. more than 1 mol of formaldehyde per mol of phenol. Typically, the molar ratio of phenol to formaldehyde is around 1:2.3 to 2.4.

To demonstrate the advantages of the binder according to the invention, a molar ratio of phenol to formaldehyde of 1:2.8 was selected each time for the binders used in Example 1.

(i) was produced with no reactive additive.

For comparison, a mixture of (i) with the reactive additive, (ii), was tested. The reactive additive was incorporated by condensation in the inventive binder (iii) during production so that, based on solid resin of the binder (iii), about 22% of the reactive additive are included in solid form.

The synthetic resin starting material (i) and the binder according to the invention (iii) are characterized by the following characteristic values:

| Characteristic value | (i) | (iii) |
|---|---|---|
| Viscosity at 20° C. | 110 mPas | 468 mPas |
| Resin content | 55.9% | 48.6% |
| pH value | 9.1 | 11.8 |
| Gelling time at 100° C. | 21' 20" | 28' 30" |
| B time at 150° C. | 47" | 60" |

Results of Board Production

Production of HDF Boards with PF Peptide Binder

As binders, (i) a synthetic resin starting material, (ii) a mixture of the synthetic resin starting material and a peptide/amino acid mixture (reactive additive), and (iii) a resin were used, which was prepared at a molar ratio analogous to (i) by incorporating ANiPEPT FF-M by condensation. The comparative tests were performed at a comparable order of magnitude of binder used (FIG. 3).

As evident from the example, the inventive combination achieves quite comparable mechanical properties of the boards thus produced.

Conspicuously and surprisingly, there is a very agreeable side effect demonstrating the highly improved incorporation of natural structures in the overall binder compared to the prior art.

As a result of the high molar ratio, an above-average perforator value was determined in the PF base resin.

Specifically when incorporating by condensation the peptide/amino acid mixture (reactive additive) in a PF base resin of equal phenol/formaldehyde molar ratio, the significant improvements in subsequent liberation of formaldehyde as a result of almost complete incorporation of the entire formaldehyde present in the binder system in the cured resin structure become apparent, so that the formaldehyde emission potential can be reduced by orders of magnitude.

EXAMPLE 2

Production of Chipboards Using an UF Peptide Binder (FIG. 4)

As binders, (iv) a synthetic UF resin with a urea/formaldehyde molar ratio of from 1:1.2, (v) a mixture of the synthetic resin starting material and a peptide/amino acid mixture (reactive additive) and (vi) a resin were used, which was prepared by incorporating the peptide/amino acid mixture (reactive additive) in the synthetic resin starting material mentioned under (i) by condensation.

| Characteristic value | (iv) | (v) | (vii) |
|---|---|---|---|
| Viscosity at 20° C. | 277 mPas | 641 mPas | 362 mPas |
| Resin content | 63.9% | 66.6% | 65.2% |
| pH value | 9.5 | 10.0 | 9.7 |
| Gelling time at 100° C. | 37" | 58" | 52" |

The comparative tests were performed at a comparable order of magnitude of binder used.

The transverse tensile strengths of resins modified with the peptide/amino acid mixture are lower. They can be improved by using more intense curing (more powerful or higher amounts of curing agent) or by modifying the process conditions (longer press times and/or higher press temperatures).

As above in the variants shown in Example 1, subsequent formaldehyde emission of the board bonded with the resin starting material was likewise reduced in Example 2, especially when using the inventive binder produced by incorporation of the peptide/amino acid mixture (reactive additive) in the resin starting material by condensation, which is illustrated by comparing the perforator values measured on these panels according to EN 120.

EXAMPLE 3

Use of the Peptide/Amino Acid Mixture (Reactive Additive) with No Synthetic Binder Component in Wood Material Production (FIG. 5)

While testable boards are obtained when using no synthetic binder component (extended press times, not optimized), the strengths, however, are very low. What is remarkable are the low formaldehyde contents measured as perforator value, which are in the range of native wood.

The invention claimed is:

1. A binder for materials based on wood chips and/or wood fibers, comprising an aldehyde-based condensation resin and further additives, characterized in that it has a water-soluble reactive additive including a peptide/amino acid mixture without a proportion of water-insoluble and highly viscous proteins.

2. The binder according to claim 1, characterized in that peptides and amino acids in the peptide/amino acid mixture are present in a mass ratio of from 0.1:1 to 10:1.

3. The binder according to claim 1, characterized in that the reactive additive has a molecular weight distribution of about 90% of the total amount between 0.13 to 50 kilodaltons (kDa) at an average molecular weight of 1 to 20 kDa.

4. The binder according to claim 1, characterized in that the reactive additive has a reactive amino nitrogen content of from 0.7 to 5%, based on the dry mass.

5. The binder according to claim 1, characterized in that the reactive additive can be produced by means of high-pressure thermolysis of proteinaceous animal raw materials in an aqueous medium, which is performed in two stages, wherein in a first stage a temperature of from 140 to 190° C. and a pressure of from 10 to 50 bar is adjusted at a hold time of from 5 to 60 min, and in a second stage a target temperature of from 180 to 230° C. and a pressure of from 20 to 100 bar is adjusted at a hold time of from 1 to 30 min, said hold time decreasing from stage to stage.

6. The binder according to claim 1, characterized in that the aldehyde is formaldehyde.

7. The binder according to claim 1, characterized in that the formaldehyde-based condensation resin is preferably selected from the group of urea-formaldehyde (UF), melamine-formaldehyde (MF), melamine-urea-formaldehyde (MUF), melamine-urea-phenol-formaldehyde (MUPF), phenol-formaldehyde (PF), phenol-melamine-formaldehyde (PMF), phenol-urea-formaldehyde (PUF), resorcinol-phenol-formaldehyde (RPF), resorcinol-phenol-urea-formaldehyde (RPUF) and/or mixtures thereof.

8. The binder according to claim 1, characterized in that the binder includes 1 to 60% by weight reactive additive.

9. The binder according to claim 1, characterized in that the binder includes 2 to 50% by weight reactive additive.

10. The binder according to claim 1, characterized in that the binder includes 5 to 40% by weight reactive additive.

11. The binder according to claim 1, characterized in that hydrophobizing agents, flame retardants and/or fungicides, bactericides, dyes, pigments, odor inhibitors, conductivity-increasing substances, viscosity-increasing additives, as well as fillers or extenders are included as further additives.

12. The binder according to claim 1, characterized in that thermoplastics such as polyolefins, polyvinyl chloride, bonding fibers, polyvinyl acetate and/or additives based on proteins, lignins, tannins, polysaccharides such as starch, and/or polyurethanes as well as polymeric diisocyanates such as polymeric diphenylmethane diisocyanates and mixtures thereof are included as further additives.

13. A method for producing the binder according to claim 1, characterized in that the reactive additive is incorporated in the aldehyde-based condensation resin by chemical condensation during resin production and/or added following resin production and/or immediately prior to processing the binder by grinding or mixing in liquid phase or by means of other suitable mixing procedures.

14. A molded article based on wood chips and/or wood fibers, characterized in that a binder in accordance with claim 1 is included.

* * * * *

UNITED STATES PATENT AND TRADEMARK OFFICE

CERTIFICATE OF CORRECTION

PATENT NO. : 8,461,259 B2
APPLICATION NO. : 12/809515
DATED : June 11, 2013
INVENTOR(S) : van Herwijnen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this
Eighth Day of September, 2015

Michelle K. Lee
*Director of the United States Patent and Trademark Office*